(12) United States Patent
Snow et al.

(10) Patent No.: US 9,672,548 B2
(45) Date of Patent: Jun. 6, 2017

(54) REPUTATION MANAGEMENT SYSTEMS AND METHODS

(75) Inventors: David Jeffrey Snow, Mountain View, CA (US); Konstantin Orlov, Santa Clara, CA (US); Roseann Stempinski, San Francisco, CA (US); Anna Phan, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 416 days.

(21) Appl. No.: 13/341,441

(22) Filed: Dec. 30, 2011

(65) Prior Publication Data

US 2013/0173423 A1 Jul. 4, 2013

(51) Int. Cl.
*G06Q 30/00* (2012.01)
*G06Q 30/06* (2012.01)

(52) U.S. Cl.
CPC ......... *G06Q 30/0609* (2013.01); *G06Q 30/06* (2013.01); *G06Q 30/0639* (2013.01)

(58) Field of Classification Search
CPC .......................................... G06Q 30/00–30/08
USPC .............................................. 705/26.1–27.2
See application file for complete search history.

(56) References Cited

U.S. PATENT DOCUMENTS

| | | | | |
|---|---|---|---|---|
| 7,450,734 B2 * | 11/2008 | Rodriguez et al. | ........... | 382/100 |
| 7,774,350 B2 * | 8/2010 | Widjojo et al. | ............... | 707/752 |
| 8,005,831 B2 | 8/2011 | Hull et al. | | |
| 2010/0217684 A1 * | 8/2010 | Melcher et al. | ................ | 705/27 |
| 2011/0145095 A1 * | 6/2011 | Giesler et al. | ............. | 705/26.81 |
| 2012/0084181 A1 * | 4/2012 | Miura et al. | ................ | 705/27.1 |

FOREIGN PATENT DOCUMENTS

WO  WO-2013101916 A1  7/2013

OTHER PUBLICATIONS

"Returns on Reputation in Retail E-Commerce". Saastamoinen, Jani. Journal of Electronic Commerce Research; Long Beach 10.4 (2009): 196-219. Retrieved via ProQuest on Jan. 24, 2017.*
"The Impact of Seller Reputation on the Performance of Online Sales: Evidence from TaoBao Buy-It-Now (BIN) Data." Ye, Qiang; Li, Yijun; Kiang, Melody; Wu, Weifang. Database for Advances in Information Systems; New York 40.1 (Feb. 2009): 12-19.Retrieved via ProQuest on Jan. 24, 2017.*
"International Application Serial No. PCT/US2012/071791, International Search Report mailed Mar. 8, 2013", 2 pgs.

(Continued)

*Primary Examiner* — Michael Misiaszek
(74) *Attorney, Agent, or Firm* — Schwegman Lundberg & Woessner, P.A.

(57) ABSTRACT

A method and system to manage user reputations is described. In some embodiments, a first picture is received from a first user and a second picture is received from a second user. The first picture and the second picture are associated with an in-person transaction related to an item. The method determines whether both the first picture and the second picture identify the item. The method further determines whether both the first picture and the second picture were taken at a similar geographic location. If the first picture and the second picture identify the item and were taken at a similar geographic location, transaction feedback is requested from the first user. A reputation score related to the second user is updated based on transaction feedback received from the first user.

20 Claims, 8 Drawing Sheets

(56) References Cited

OTHER PUBLICATIONS

"International Application Serial No. PCT/US2012/071791, Written Opinion mailed Mar. 8, 2013", 5 pgs.
"International Application Serial No. PCT/US2012/071791, International Preliminary Report on Patentability mailed Jul. 10, 2014", 7 pgs.

* cited by examiner

USER NAME: JAKE
REPUTATION SCORE: 51
LOCATION: SAN JOSE

502

ITEMS SOLD: | LAST MONTH ▼ |

ITEM: BIKE
DATE: 2/16/2011
BUYER NAME: VIENNA

SELLER ON TIME? YES
ITEM AS DESCRIBED? YES
WOULD YOU BUY FROM
THIS SELLER AGAIN? YES

ITEM: LAPTOP
DATE: 2/03/2011
BUYER NAME: GEORGE

SELLER ON TIME? YES
ITEM AS DESCRIBED? YES
WOULD YOU BUY FROM
THIS SELLER AGAIN? YES

FIG. 5

| | |
|---|---|
| USER ID | 10044589 |
| USERNAME | BIGDOG83 |
| PASSWORD | 4RUN399 |
| CITY | SAN JOSE |
| STATE | CA |
| REPUTATION SCORE | 122 |
| TRANSACTION 1 DATE AND TIME | 04122011 14:22 |
| TRANSACTION 1 LOCATION | SUNNYVALE, CA |
| TRANSACTION 1 GPS COORDINATES | N37 22.14677 W122 2.21736 |
| TRANSACTION 1 FEEDBACK | 5 |
| MARKETPLACE 1 ID | 12885 |
| MARKETPLACE 1 USER ACCOUNT ID | 2308871 |
| MARKETPLACE 1 USER STATUS | ACTIVE |

REPUTATION MANAGEMENT SYSTEMS AND METHODS

TECHNICAL FIELD

The present disclosure generally relates to network communications and, more specifically, to systems and methods for managing user reputations based on commerce transactions and related activities.

BACKGROUND

Advancements in computer and networking technology enable users and entities to conduct various types of online activities via computer-based applications and systems. These online activities may include offering items for purchase through listings in a network-based marketplace. In some situations, a prospective buyer of an item is in the same geographic location (e.g., the same city or region) as a user or entity generating the item listing. In this situation, the prospective buyer can meet with the user or entity generating the item listing to see the item first-hand. However, prospective buyers may have safety concerns when meeting unknown people with whom they have only communicated online. These safety concerns can be alleviated by providing a mechanism that creates and monitors a person's reputation regarding in-person transactions and related activities.

BRIEF DESCRIPTION OF THE DRAWINGS

Some embodiments are illustrated by way of example and not limitation in the figures of the accompanying drawings.

DETAILED DESCRIPTION

Example systems and methods to manage user or entity reputations based on in-person transactions and other activities are described. In the following description, for purposes of explanation, numerous specific details are set forth in order to provide a thorough understanding of example embodiments. It will be evident, however, to one skilled in the art that the present invention may be practiced without these specific details.

As used herein, a "user" or an "entity" may be a person (e.g., a human), a business (e.g., a company), an organization, a group of people, a persona (e.g., a fictitious character), a bot (e.g., an automated program that performs particular functions), or any combination thereof. Although particular examples discussed herein refer to "products", the teachings of the described systems and methods are applicable to any type of electronic commerce listing for any product, service, item, and the like.

Figure 1:
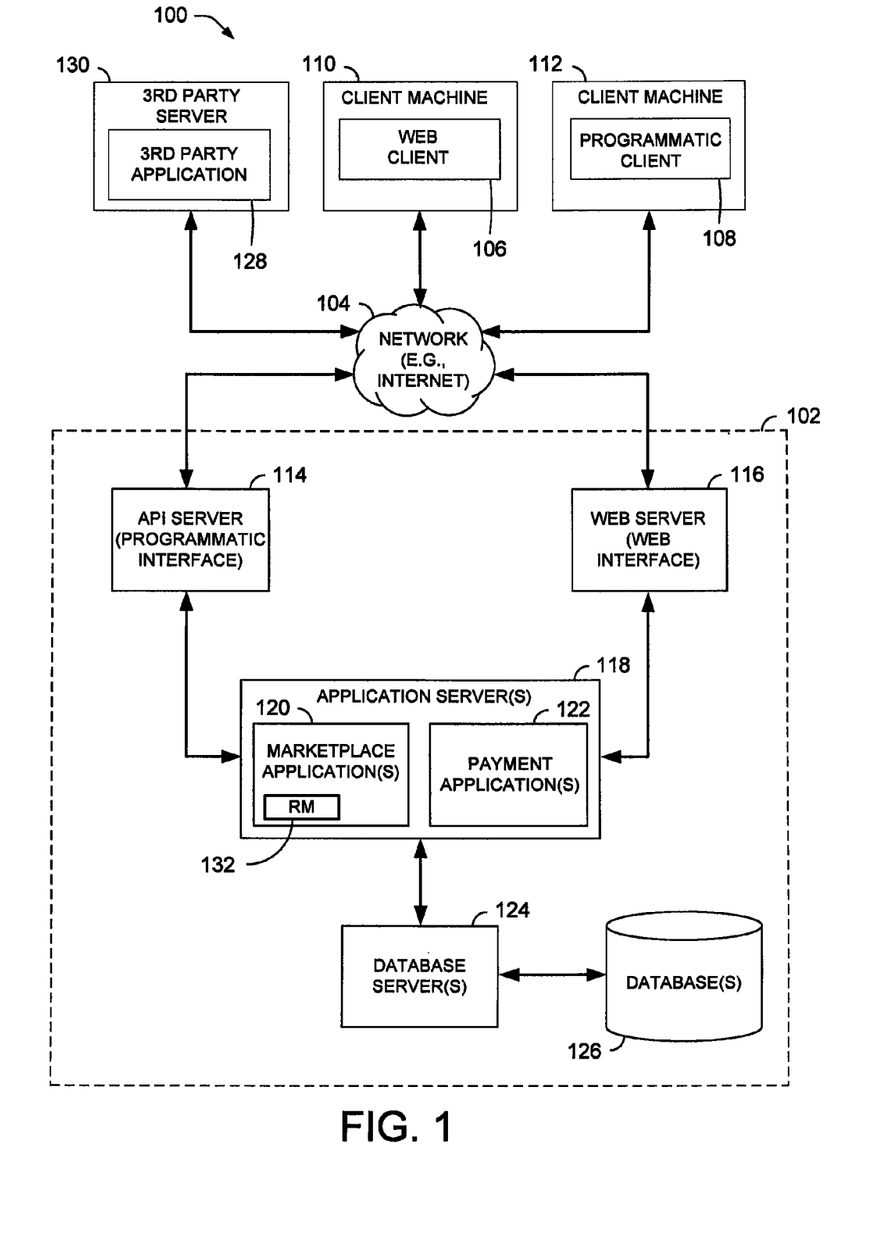
FIG. 1 is a block diagram of a client-server system within which an example embodiment may be deployed.

FIG. 1 is a block diagram of a client-server system 100 within which an example embodiment may be deployed. A networked system 102, in the example forms of a network-based marketplace or publication system, provides server-side functionality via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.), and a programmatic client 108 executing on respective client machines 110 and 112.

An Application Programming Interface (API) server 114 and a web server 116 are coupled to, and provide programmatic and web interfaces respectively to, one or more application servers 118. Application servers 118 host one or more marketplace applications 120 and payment applications 122. Application servers 118 are, in turn, shown to be coupled to one or more database servers 124 that facilitate access to one or more databases 126.

Marketplace applications 120 may provide a number of marketplace functions and services to users that access networked system 102. Payment applications 122 may likewise provide a number of payment services and functions to users. Payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of networked system 102, it will be appreciated that, in alternative embodiments, payment applications 122 may form part of a payment service that is separate and distinct from networked system 102.

Further, while the system 100 shown in FIG. 1 employs a client-server architecture, the present invention is not limited to such an architecture, and could equally well find application in a distributed, or peer-to-peer, architecture system, for example. The various marketplace and payment applications 120 and 122 could also be implemented as standalone software programs, which do not necessarily have networking capabilities.

Web client 106 accesses the various marketplace and payment applications 120 and 122 via the web interface supported by web server 116. Similarly, programmatic client 108 accesses the various services and functions provided by the marketplace and payment applications 120 and 122 via the programmatic interface provided by API server 114. Programmatic client 108 may, for example, be a seller application (e.g., the TurboLister application developed by eBay Inc., of San Jose, Calif.) to enable sellers to author and manage listings on networked system 102 in an off-line manner, and to perform batch-mode communications between programmatic client 108 and networked system 102. Some embodiments of the present invention may be implemented by components of the marketplace application(s) 120. For example, a reputation manager 132 or other system performs various reputation-based operations and activities described herein.

FIG. 1 also illustrates a third party application 128, executing on a third party server machine 130, as having programmatic access to networked system 102 via the programmatic interface provided by API server 114. For example, third party application 128 may, utilizing information retrieved from networked system 102, support one or more features or functions on a website hosted by the third party. The third party website may, for example, provide one or more promotional, marketplace or payment functions that are supported by the relevant applications of the networked system 102.

Figure 2:
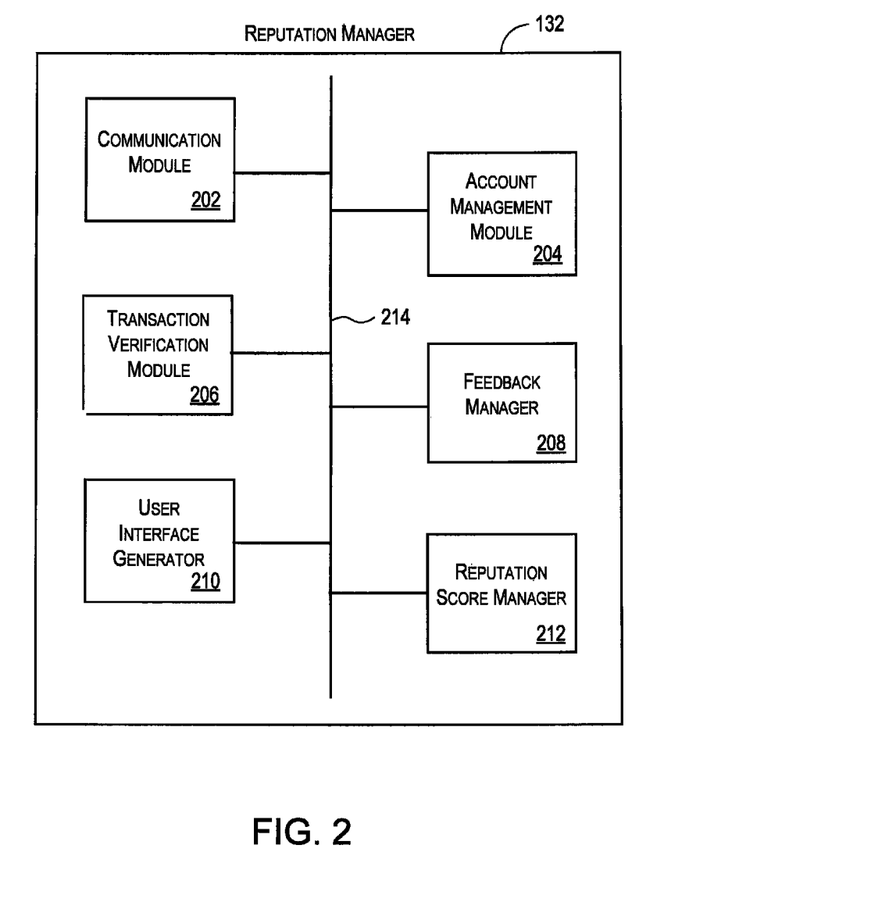
FIG. 2 is a block diagram of a reputation manager, in accordance with some embodiments of the present invention.

FIG. 2 is a block diagram of reputation manager 132, in accordance with some embodiments of the present invention. Reputation manager 132 may be executed or included in, for example, an application server 118 shown in FIG. 1. In various embodiments, reputation manager 132 implements computer programs, logic, applications, methods, processes, or software to manage reputation data associated with any number of users or entities.

In the embodiment of FIG. 2, reputation manager 132 includes a communication module 202 that communicates with other systems and components to implement the functions described herein. An account management module 204 handles the creation and management of multiple user accounts with reputation manager 132. Each user account includes, for example, user information (such as username and password, profile information, and contact information), a reputation score, feedback information, and transaction history associated with the user. Example transaction history information includes transaction times, locations, and GPS (Global Positioning System) coordinates. Each user account may also include links to other user information, such as user accounts (or user account status) in different online marketplaces.

Reputation manager 132 also includes a transaction verification module 206 that verifies transaction data submitted by multiple users (e.g., a buyer and a seller associated with an in-person transaction). A feedback manager 208 collects feedback about transactions from multiple users. This feedback is used, for example, to calculate a reputation score and to provide information about a particular user to prospective buyers or prospective sellers before engaging in a transaction with the particular user. A user interface generator 210 creates various user interfaces to collect information from users and to display reputation-related information to users. A reputation score manager 212 calculates reputation scores for various users based on verified transactions, feedback information received, and the like. A communication bus 214 is coupled to the various modules and components in reputation manager 132, thereby allowing the modules and components to communicate with one another. Communication bus 214 may use any communication protocol and any communication media.

In alternate embodiments, reputation manager 132 may include fewer or more modules apart from those shown in FIG. 2. For example, in one alternate embodiment, transaction verification module 206 is integrated within feedback manager 208. Communication module 202, account management module 204, transaction verification module 206, feedback manager 208, user interface generator 210, and reputation score manager 212 may be in the form of software that is processed by a processor. In another example, as described herein, modules 202, 204, 206, 208, 210, and 212 may be in the form of firmware that is processed by application specific integrated circuits (ASICs), which may be integrated into a circuit board. Alternatively, modules 202, 204, 206, 208, 210, and 212 may be in the form of one or more logic blocks included in a programmable logic device (e.g., a field programmable gate array (FPGA)). The described modules 202, 204, 206, 208, 210, and 212 may be adapted, and/or additional structures may be used to provide alternative or additional functionalities beyond those specifically discussed with reference to FIG. 2.

Figure 3A:
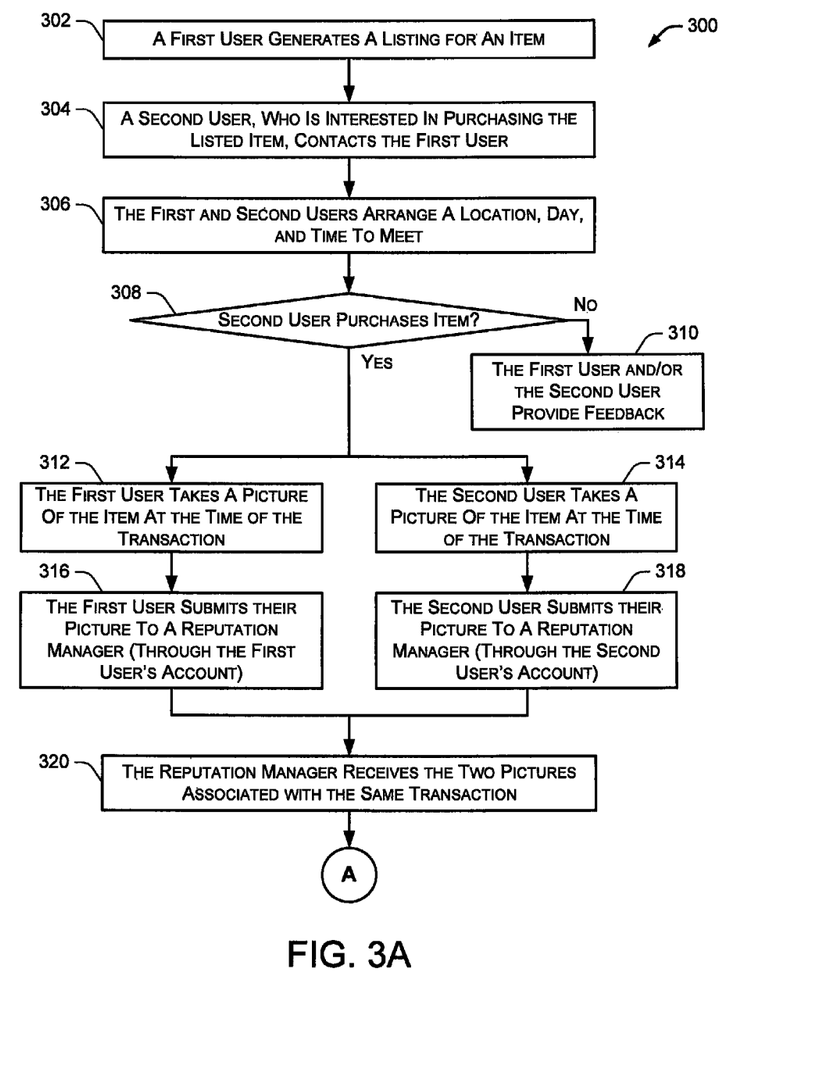
FIGS. 3A and 3B represent a flow diagram of a method, in accordance with an embodiment, of submitting and verifying transaction information related to an in-person transaction between two users.
Figure 3B:
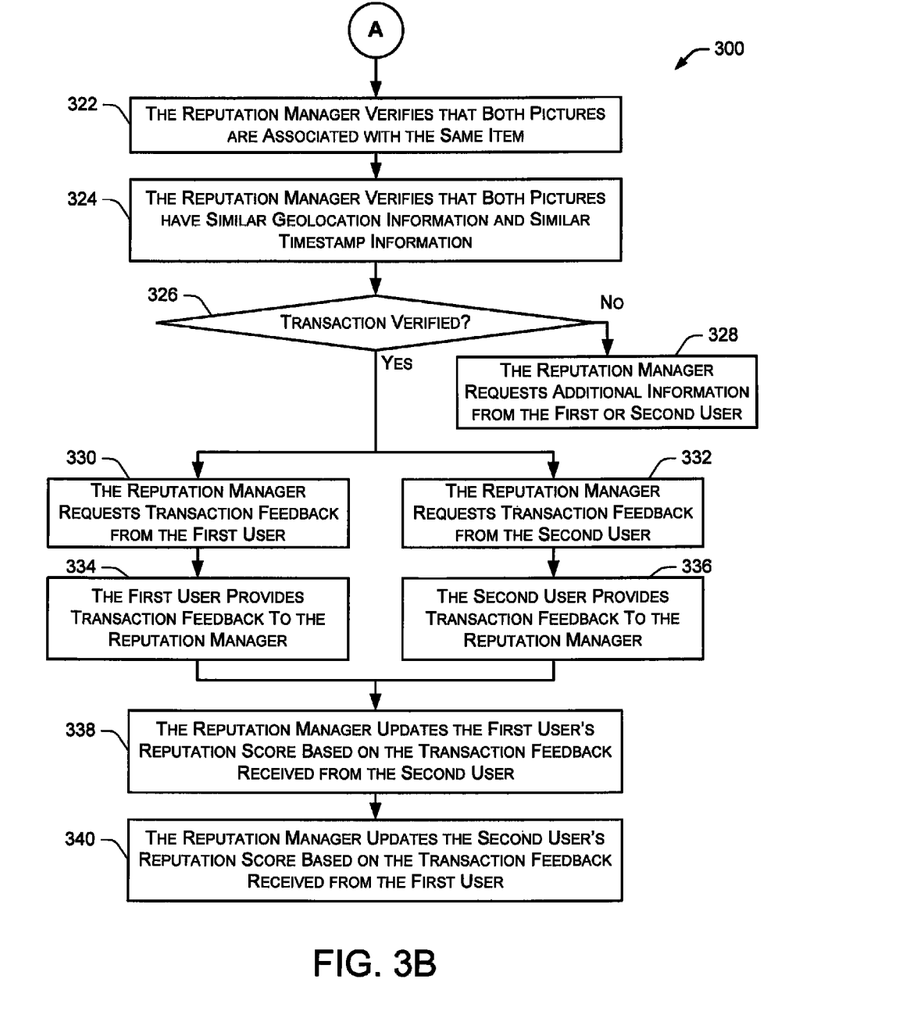

FIGS. 3A and 3B represent a flow diagram of a method 300, in accordance with an embodiment, of submitting and verifying transaction information related to an in-person transaction between two users. In a particular embodiment, at least a portion of method 300 is implemented by a processor or computing system, such as one or more of the processors and computing systems discussed herein. Initially, a first user (e.g., a seller of the item) generates a listing for an item at 302. This listing may be generated through a network-based marketplace, such as an online classified marketplace. In some embodiments, the item listing includes a geographic location of the item, which allows other users (e.g., prospective buyers) to search for item listings near their geographic location. Additionally, the listing may include information about the first user, such as reputation score, history of recent transactions, feedback based on other transactions, and the like.

A second user discovers the item listing and is interested in purchasing the item. The second user can view the first user's reputation score, history of recent transactions, and feedback before contacting the first user. This information about the first user is comforting to prospective buyers who might otherwise avoid in-person meetings with unknown sellers. If, after reviewing the information about the first user, the second user wants to learn more about the item, the second user contacts the first user at 304. If the second user wants to see the item in person, and is comfortable with meeting the first user, the first and second users arrange a location, day, and time to meet at 306. At the scheduled day and time, the first user brings the item to the arranged meeting location. The second user meets the first user and has an opportunity to inspect the item. If the second user does not purchase the item at 308, the first user and/or the second user may provide feedback to a reputation manager at 310. For example, if the item was not as advertised or the first user did not meet at the arranged time and location, the second user may provide negative feedback to the reputation manager regarding the first user. Similarly, if the second user does not meet at the arranged time and location, the first user can provide negative feedback to the reputation manager regarding the second user.

If the second user purchases the item at 308, both users take a picture of the item at the approximate time of the transaction. In particular, the first user takes a picture of the item at 312 and the second user takes a picture of the item at 314. For example, the first and second users can take the picture using a camera, a cellular phone having a built-in camera, a tablet computing device, or any other device capable of taking a picture of the item. In some embodiments, the first user takes a picture of the item using a first device (e.g., cellular phone) and the second user takes a picture of the item using a second device (e.g., a camera). In other embodiments, both users take a picture of the item using the same type of device.

After taking a picture of the item, each user submits their picture to the reputation manager through their corresponding user account. In particular, the first user submits their picture at 316 and the second user submits their picture at 318. The users can submit pictures by emailing them to a particular email address, uploading them to a designated web server, sending a SMS (Short Message Service) message, and the like. In some embodiments, a user needs to establish an account with the reputation manager prior to submitting a picture. If a user without an account attempts to submit a picture to the reputation manager, the reputation manager gives the user an option to open an account through which the picture can be submitted.

In one implementation, each user identifies the other user involved in the transaction when submitting their picture. For example, the first user identifies the second user as the other participant in the transaction. Similarly, the first user identifies the second user as the other participant in the transaction. This implementation allows the reputation manager to request a picture from one of the users if a single picture is received. For example, if the first user submits a picture and identifies the second user as being involved in the transaction, the reputation manager can send a reminder to the second user if a picture is not received from the second user within a predetermined time period (e.g., 24 hours).

The method 300 continues as reputation manager receives the two pictures associated with the same transaction (e.g., two pictures of the same item) at 320. Since the two pictures were taken by two different users with two different devices, the pictures are not likely to be identical. Further, the pictures may be taken at different angles, different resolutions, and so forth which creates differences between the pictures even though they both show the same item. The reputation manager verifies that both pictures are associated with the same item at 322. This verification ensures that both users submit pictures of the same item, even though there are differences between the two pictures.

The reputation manager also verifies that both pictures have similar geolocation information and similar timestamp information at 324. Many cameras, cellular phones, and other devices record geolocation and date/time information when a picture is taken. The geolocation and date/time information is stored along with the image data in the picture. The geolocation information identifies the approximate geographic location at which the picture was taken (e.g., latitude and longitude coordinates). To ensure that both pictures are associated with the same transaction, the reputation manager compares the geolocation and date/time information for each picture submitted. If there is a slight difference in the geolocation or time information, the reputation manager may still consider the two pictures a "match" for purposes of verifying the transaction. For example, a variance of a few minutes or a few feet in location will typically be considered a match. However, a time variance of several hours or a location variance of several miles will not typically be considered a match.

If the transaction is not verified by the reputation manager at 326, the reputation manager may request additional information from the first or second user at 328. For example, if the picture submitted by the second user has time information that is several hours later than the picture submitted by the first user, the reputation manager may ask the first user and/or the second user to explain the discrepancy it the time at which the pictures were taken. If an acceptable explanation is received from the first and/or second user, the transaction may be verified at a later time.

If the transaction is verified at 326, the reputation manager requests transaction feedback from both users. In particular, the reputation manager requests transaction feedback from the first user at 330 and requests transaction feedback from the second user at 332. In response to the requests, the first and second users provide feedback regarding the other user to the reputation manager. In particular, the first user provides transaction feedback associated with the second user to the reputation manager at 334. Similarly, the second user provides transaction feedback associated with the first user to the reputation manager at 336. For example, the second user may provide feedback indicating that the first user arrived on time for the meeting and the item was as described. Additionally, the first user may provide feedback indicating that the second user arrived on time and had funds available to complete the purchase transaction during the meeting.

The method 300 continues as the reputation manager updates the first user's reputation score based on the transaction feedback received from the second user at 338. Similarly, the reputation manager updates the second user's reputation score based on the transaction feedback received from the first user at 340. A particular user's reputation score is calculated based on the feedback received from multiple users who have been involved in transactions with the particular user. Example factors that may be considered in determining a user's reputation score include ratio of positive-to-negative feedback from other users, frequency of transactions (more frequent transactions typically provides a better reputation), and the time taken by the user to provide feedback (quicker feedback may provide a better reputation). Additional factors that can be considered in determining a user's reputation score include transaction values (higher value transactions may provide a better reputation) and the number of different people with which the user has completed transactions. For example, large numbers of transactions between a small group of users may indicate an attempt to increase reputation scores within the small group. The group of users provide feedback on multiple "artificial transactions" which are not true transactions, but instead are staged transactions implemented for purposes of inflating reputation scores for users in the small group.

In some embodiments, the reputation manager maintains a history of all verified transactions associated with a particular user. Thus, in addition to the particular user's reputation score, other users can, see the types of transactions in which the particular user was involved. This transaction history information may indicate locations for transactions, such as a local coffee shop. In this situation, a prospective buyer can suggest meeting at the same coffee shop that identified in the particular user's transaction history.

Figure 4:
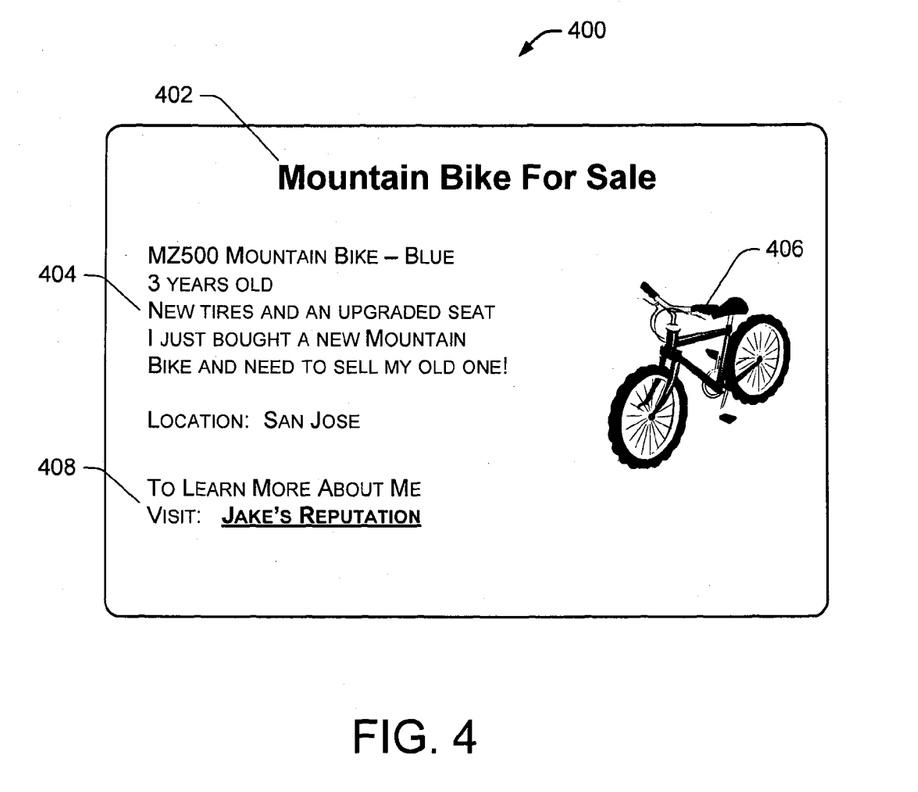
FIG. 4 depicts, in accordance with an embodiment, a portion of a user interface for displaying an online classified listing.

FIG. 4 depicts, in accordance with an embodiment, a portion of a user interface 400 for displaying an online classified listing. The listing shown in FIG. 4 includes a title 402 identifying the item being sold, a description of the item 404, and a picture of the item 406. Additionally, the online classified listing displays a link (or other information) 408 associated with one or more entries in the reputation manager. The link is associated with the reputation of the user who created the listing shown in FIG. 4. In this example, a user named "Jake" created the online classified listing. When a user activates link 408, additional information regarding the listing user's reputation is displayed.

Figure 5:
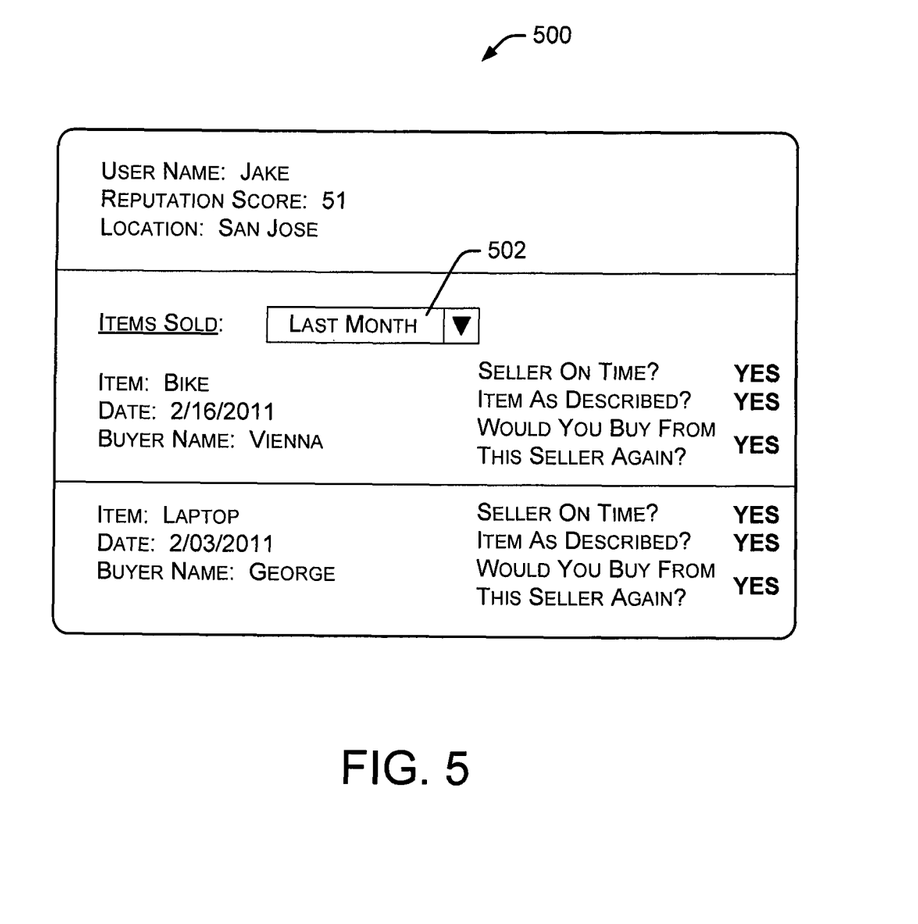
FIG. 5 depicts, in accordance with an embodiment, a portion of a user interface for displaying feedback information and transaction information for a particular user.

FIG. 5 depicts, in accordance with an embodiment, a portion of a user interface 500 for displaying feedback information and transaction information for a particular user. In this example, the user's reputation score is displayed along with recent transactions associated with the user. For each transaction, feedback received from the other user in the transaction is displayed in user interface 500. The recent transactions displayed in user interface 500 can change based on the setting of a display parameter 502. In the example of FIG. 5, user interface 500 displays transactions completed during the past month. Alternate settings may include all transactions, the five most recent transactions, and the like.

Figure 6:
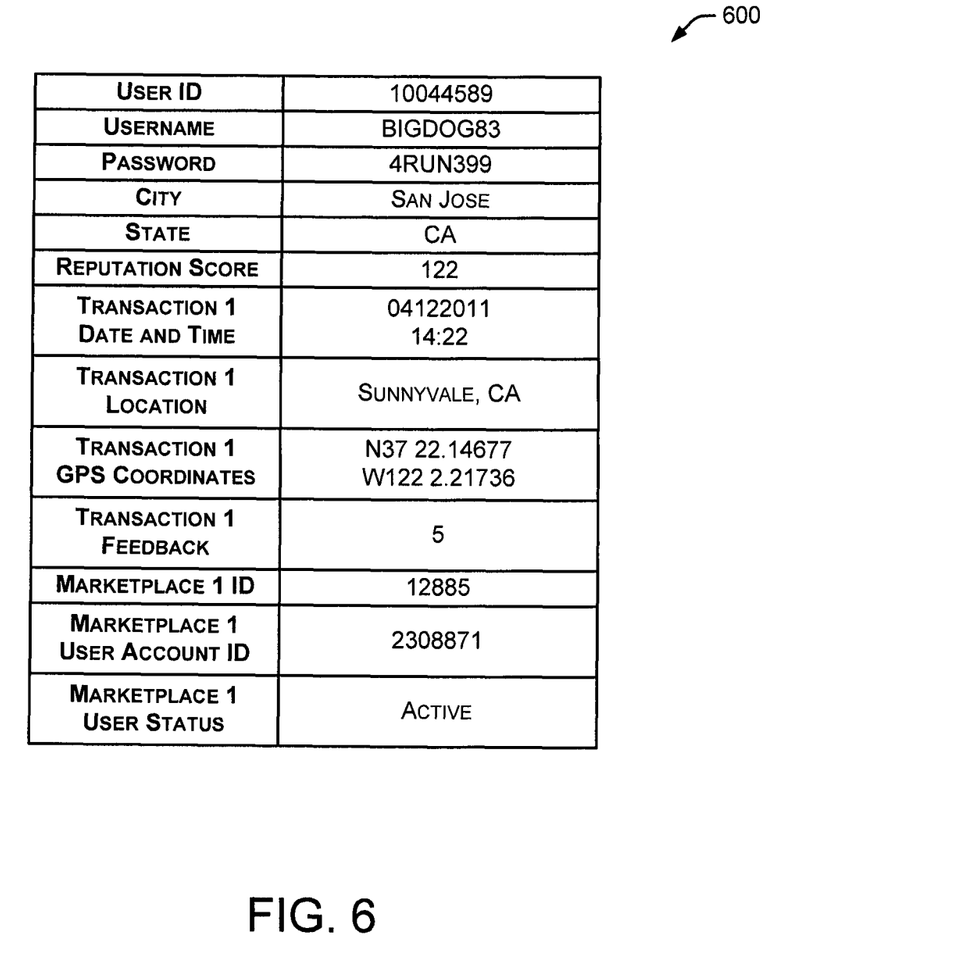
FIG. 6 depicts, in accordance with an embodiment, a table containing user data associated with a user's electronic commerce transactions.

FIG. 6 depicts, in accordance with an embodiment, a table 600 containing user data associated with a user's electronic commerce transactions. In some implementations, table 600 is contained in a database that stores similar information related to any number of different users. Table 600 includes a user ID that uniquely identifies a user, a username associated with the user, and a password used, for example, during a login process. User profile information, such as the user's city and state of residence, and the user's current reputation score are also included in table 600. Various transaction details are also included in table 600. For example, transaction date, time, location, GPS coordinates, and feedback information are stored for each transaction completed by the user. Additionally, information regarding the user's accounts with other marketplaces (e.g., online marketplaces) is contained in table 600. In the example of FIG. 6, the marketplace information includes a marketplace ID, the user's account ID associated with that marketplace, and the status of the user with that marketplace. In other embodiments, table 600 may also include a user's reputation or other rating associated with one or more marketplaces.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
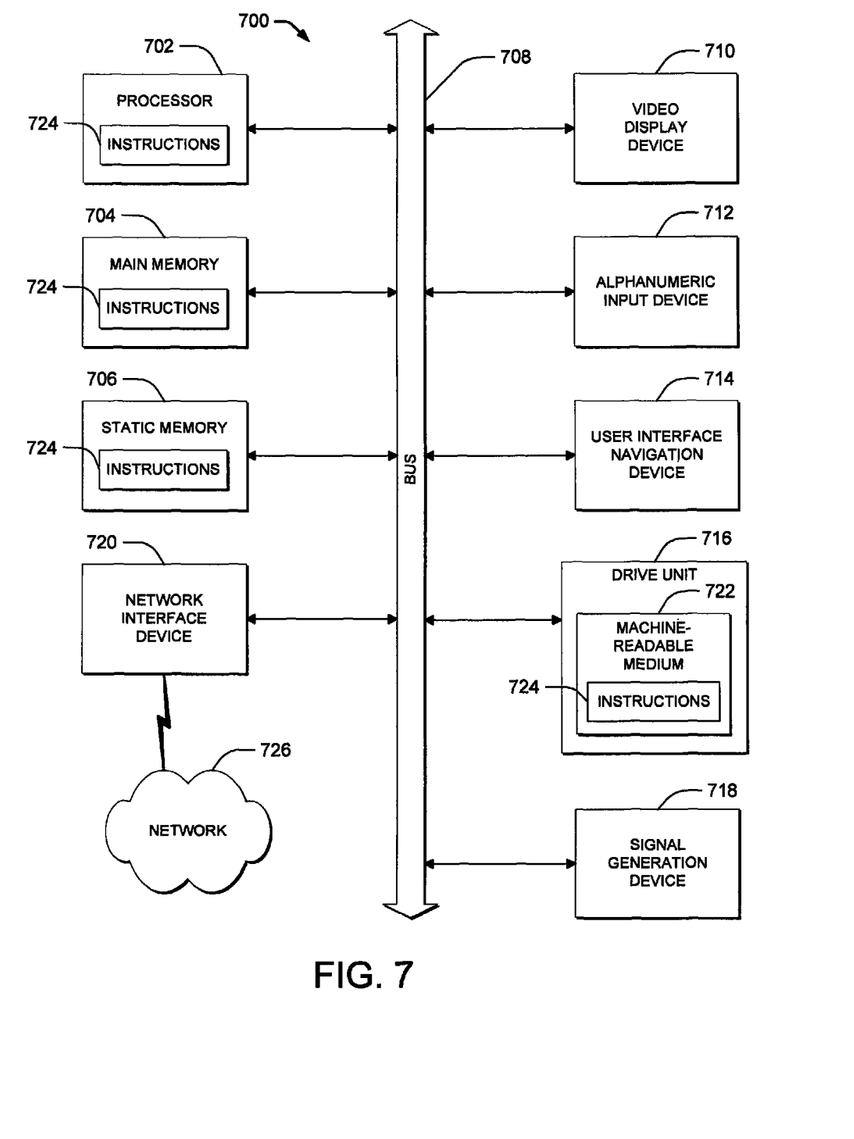
FIG. 7 is a block diagram of a machine in the example form of a computer system within which a set of instructions, for causing the machine to perform any one or more of the methodologies discussed herein, may be executed.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes a processor 702 (e.g., a central processing unit (CPU), a graphics processing unit (GPU) or both), a main memory 704, and a static memory 706, which communicate with each other via a bus 708. Computer system 700 may further include a video display device 710 (e.g., a liquid crystal display (LCD) or a cathode ray tube (CRT)). Computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

Disk drive unit 716 includes a machine-readable medium 722 on which is stored one or more sets of instructions and data structures (e.g., software) 724 embodying or utilized by any one or more of the methodologies or functions described herein. Instructions 724 may also reside, completely or at least partially, within main memory 704, within static memory 706, and/or within processor 702 during execution thereof by computer system 700, main memory 704 and processor 702 also constituting machine-readable media.

While machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 724 may further be transmitted or received over a communications network 726 using a transmission medium. Instructions 724 may be transmitted using network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
receiving a first picture from a first user device of a first user via an upload of the first picture to a designated web server, the first picture including first image metadata, the first image metadata comprising a first timestamp and a first coordinate set, the first picture taken during an in-person transaction between the first user and a second user, the in-person transaction involving a purchase of an item;
receiving a second picture from a second user device of the second user via an upload of the second picture to the designated web server, the second picture including second image metadata, the second image metadata comprising a second timestamp and a second coordinate set, the second picture taken during the in-person transaction;
determining, using one or more processors, that both the first picture and the second picture identify the item;
accessing the first image metadata and the second image metadata;
determining, using one or more processors, that both the first picture and the second picture were taken at a similar geographic location based on a comparison of the first coordinate set and the second coordinate set;
determining, using one or more processors, that both the first picture and the second picture were taken at a similar time based on a comparison of the first timestamp and the second timestamp;
responsive to determining that the first picture and the second picture identify the same item, were taken at the similar geographic location, and were taken at the similar time, determining that the in-person transaction is verified;
causing display of a transaction feedback interface at the first user device in response to the determining that the in-person transaction is verified;
receiving the transaction feedback from the first user via the transaction feedback interface;
updating a reputation score of the second user based on the received transaction feedback; and
presenting the reputation score in a user interface, the user interface comprising:
a classified listing that includes information corresponding to a second item for sale by the first user;
a user profile link corresponding to the first user selling the second item, selection of the user profile link resulting in retrieval of the transaction feedback; and
the reputation score corresponding to the user selling the second item.

2. The method of claim 1, further comprising, responsive to determining that the first picture and the second picture identify the item and were taken at the similar geographic location:
requesting feedback from the second user regarding a first user's behavior in the in-person transaction;
receiving transaction feedback from the second user; and
updating a reputation score of the first user based on the received transaction feedback.

3. The method of claim 1, further comprising, responsive to determining that the first picture and the second picture identify the item and were taken at the similar geographic location:
updating a feedback history associated with the second user based on the received transaction feedback.

4. The method of claim 1, wherein the transaction is a purchase transaction of the item by the first user from the second user.

5. The method of claim 1, wherein the transaction feedback includes an indication of whether the second user arrived at a scheduled time associated with the in-person transaction.

6. The method of claim 1, wherein the transaction feedback includes an indication of whether the item was accurately described by the second user in a listing associated with the item.

7. The method of claim 1, wherein the transaction feedback includes an indication of whether the first user would conduct another transaction with the second user in the future.

8. A method comprising:
receiving a first picture from a first user device of a first user via an upload of the first picture to a designated web server, the first picture including first image metadata, the first image metadata comprising a first timestamp and a first coordinate set, the first picture taken during an in-person transaction between the first user and a second user, the transaction involving a purchase of an item;
receiving a second picture from a second user device of the second user via an upload of the second picture to the designated web server, the second picture including second image metadata, the second image metadata comprising a second timestamp and a second coordinate set, the second picture taken during the in-person transaction;
determining; using one or more processors, that both the first picture and the second picture identify the item;
accessing the first image data and the second image data;
determining, using one or more processors, that both the first picture and the second picture were taken at a similar geographic location based on a comparison of the first coordinate set and the second coordinate set;
determining, using one or more processors, that both the first picture and the second picture were taken at a similar time based on a comparison of the first timestamp and the second timestamp;
responsive to determining that the first picture and the second picture identify the same item, were taken at the similar geographic location, and were taken at the similar time, determining that the in-person transaction is verified;
causing display of a transaction feedback interface at the first user device in response to the determining that the in-person transaction is verified;
receiving the transaction feedback from the first user via the transaction feedback interface;
updating a reputation score of the second user based on the received transaction feedback; and
presenting the reputation score in a user interface, the user interface comprising:
a classified listing that includes information corresponding to a second item for sale by a user;
a user profile link corresponding to the user selling the second item, selection of the user profile link resulting in retrieval of the transaction feedback; and the reputation score corresponding to the user selling the second item.

9. The method of claim 8, further comprising, responsive to determining that the first picture and the second picture identify the item and were taken at the similar time:
   requesting feedback from the second user regarding a first user's behavior in the transaction;
   receiving transaction feedback from the second user; and
   updating a reputation score of the first user based on the received transaction feedback.

10. The method of claim 8, further comprising, responsive to determining that the first picture and the second picture identify the item and were taken at the similar time:
    updating a feedback history of the second user based on the received transaction feedback.

11. The method of claim 8, wherein the transaction is a purchase transaction of the item by the first user from the second user.

12. The method of claim 8, wherein the transaction feedback includes an indication of whether the second user arrived at a scheduled time for the in-person transaction.

13. The method of claim 8, wherein the transaction feedback includes an indication of whether the item was accurately described by the second user in a listing for the item.

14. The method of claim 8, wherein the transaction feedback includes an indication of whether the first user would conduct another transaction with the second user in the future.

15. An apparatus comprising:
    a communication module configured to receive a first picture from a first user device of a first user and a second picture from a second user device of a second user via a designated web server, the first picture including first image metadata, the first image metadata comprising a first timestamp and a first coordinate set the second picture including second image metadata, the second image metadata comprising a second timestamp and a second coordinate set, the first picture and the second picture taken during an in-person transaction between the first user and the second user, the in-person transaction involving a purchase of an item;
    a transaction verification module configured to determine whether both the first picture and the second picture identify the item, determine that both the first picture and the second picture were taken at a similar geographic location, and determine that both the first picture and the second picture were taken at a similar time; and
    a feedback manager, responsive to verification of the first picture and second picture by the transaction verification module, configured to cause display of a transaction feedback interface at the first user device to receive transaction feedback from the first user relating to a second user's behavior during the in-person transaction and update a reputation score of the second user based on the received transaction feedback.

16. The apparatus of claim 15, further comprising a reputation score manager configured to update user reputation scores based on the transaction feedback.

17. The apparatus of claim 15, wherein the in-person transaction is a purchase transaction of the item by the first user from the second user.

18. The apparatus of claim 15, the feedback manager further configured to update a feedback history of the second user based on the received transaction feedback.

19. The apparatus of claim 15, the feedback manager further configured to receive second transaction feedback from the second user relating to a first user's behavior during the transaction and update a reputation score of the first user based on the second transaction feedback.

20. The apparatus of claim 15, wherein the received transaction feedback includes at least one of an indication of whether the second user arrived at a scheduled time for the in-person transaction, an indication of whether the item was accurately described by the second user in a listing for the item, and an indication of whether the first user would conduct another transaction with the second user.

* * * * *